No. 897,276. PATENTED SEPT. 1, 1908.
J. M. EEDSON.
SEAL LOCK.
APPLICATION FILED AUG. 14, 1905.

WITNESSES  INVENTOR
  JOHN M. EEDSON
BY
  ATTY.

UNITED STATES PATENT OFFICE.

JOHN M. EEDSON, OF DETROIT, MICHIGAN, ASSIGNOR OF ONE-HALF TO WILLIAM A. McNAIR, OF DETROIT, MICHIGAN.

SEAL-LOCK.

No. 897,276.

Specification of Letters Patent.

Patented Sept. 1, 1908.

Application filed August 14, 1905. Serial No. 274,125.

*To all whom it may concern:*

Be it known that I, JOHN M. EEDSON, a citizen of the United States, residing at Detroit, in the county of Wayne and State of Michigan, have invented certain new and useful Improvements in Seal-Locks, of which the following is a specification, reference being had therein to the accompanying drawings.

The invention relates to seal locks more particularly designed for use in sealing cars and the invention consists in the novel construction as hereinafter set forth.

Figure 1:
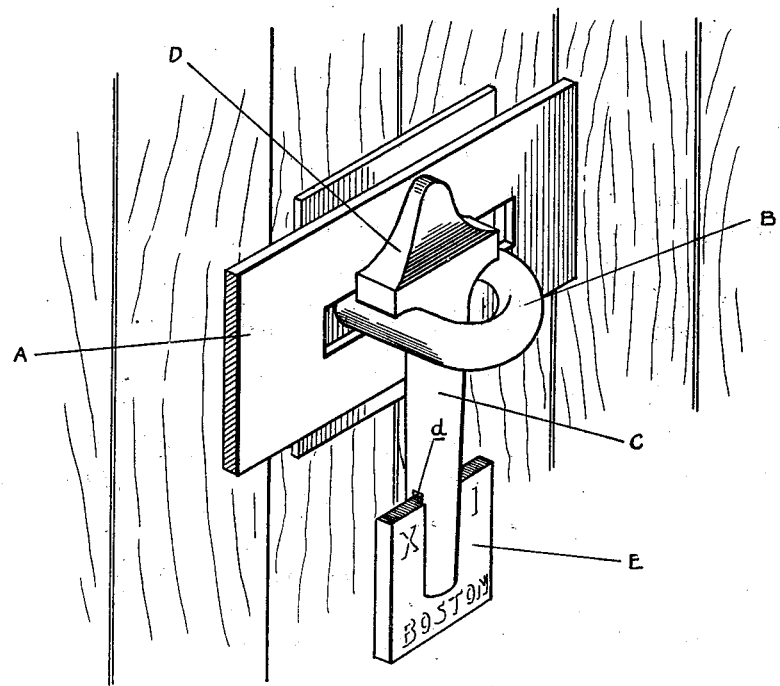
Figures 2, 3:
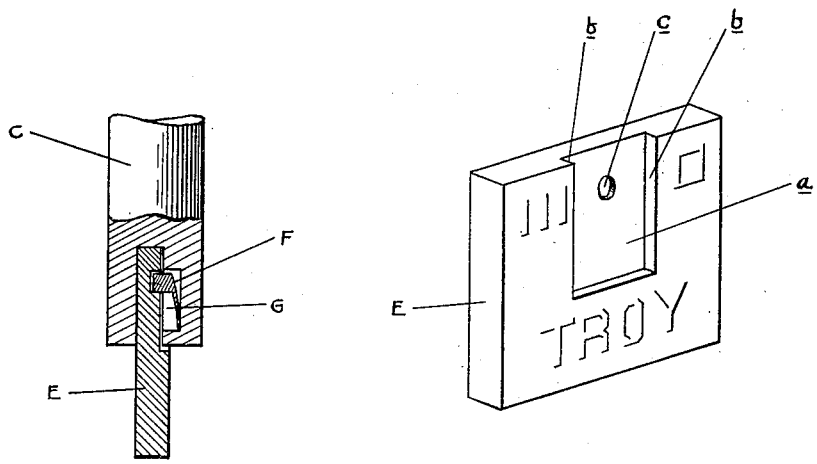

In the drawings, Figure 1 is a perspective view showing a hasp fastener to which the seal lock is applied. Fig. 2 is a longitudinal section through the lower portion of the hasp pin and seal. Fig. 3 is a perspective view of the fragile seal detached.

The fastener to which my improved seal lock is applied is preferably an ordinary hasp fastener comprising the hasp A engaging with the staple B and the hasp pin C which is passed through the staple and is provided at its upper end with the enlarged head D, these parts being of any suitable construction.

The seal which I employ is preferably formed of some inexpensive fragile material which can be easily molded into the desired shape and embossed or otherwise marked for identification. For this purpose I preferably employ common pottery or tile and the seals are preferably formed of this material in the shape of flat plates such as E, Fig. 3. The lower end of the hasp pin is slotted to receive the plate and a groove $a$ is preferably formed in one or both sides of the plate E so as to produce the opposite shoulders $b$ which engage with the hasp pin, thus forming a break or angle joint which prevents displacement of the seal plate. The seal is locked by the engagement of a catch F located within a recess G in the hasp pin with an aperture or recess $c$ in the seal plate E.

The catch F is preferably spring pressed and is adapted when the seal plate is pressed into the slot $d$ of the hasp pin to spring into the recess $c$ and prevent the withdrawal of the plate. Thus when the seal plate is engaged in this manner it cannot be removed without being broken and as the width of the plate is such as to prevent the hasp pin from being withdrawn from the staple the hasp fastener is effectually sealed. When the seal is broken, since the plate is weakened along the line of the margin of the groove, the portion of the plate within the slot of the hasp will be severed from the portion without and the pin may be readily removed from the staple. The plates E may be formed by suitable dies and the marginal portions of said plates, that is beyond the recess $a$ may be suitably embossed or fashioned for identification.

What I claim as my invention is:—

1. A seal lock comprising a slotted hasp pin, a catch within said pin projecting into the slot thereof and a fragile plate grooved to engage the slot in said pin and recessed for engagement with said catch, the sides of the groove in said plate forming a break joint preventing access to said catch.

2. A seal lock comprising a slotted hasp pin, a catch within said pin projecting into said slot and a fragile pottery plate grooved to engage said slot and form an angle joint with the side thereof in which said catch is located, said plate being also recessed for engagement with said catch.

In testimony whereof I affix my signature in presence of two witnesses.

JOHN M. EEDSON.

Witnesses:
  JAMES P. BARRY,
  AMELIA WILLIAMS.